Patented Dec. 23, 1941

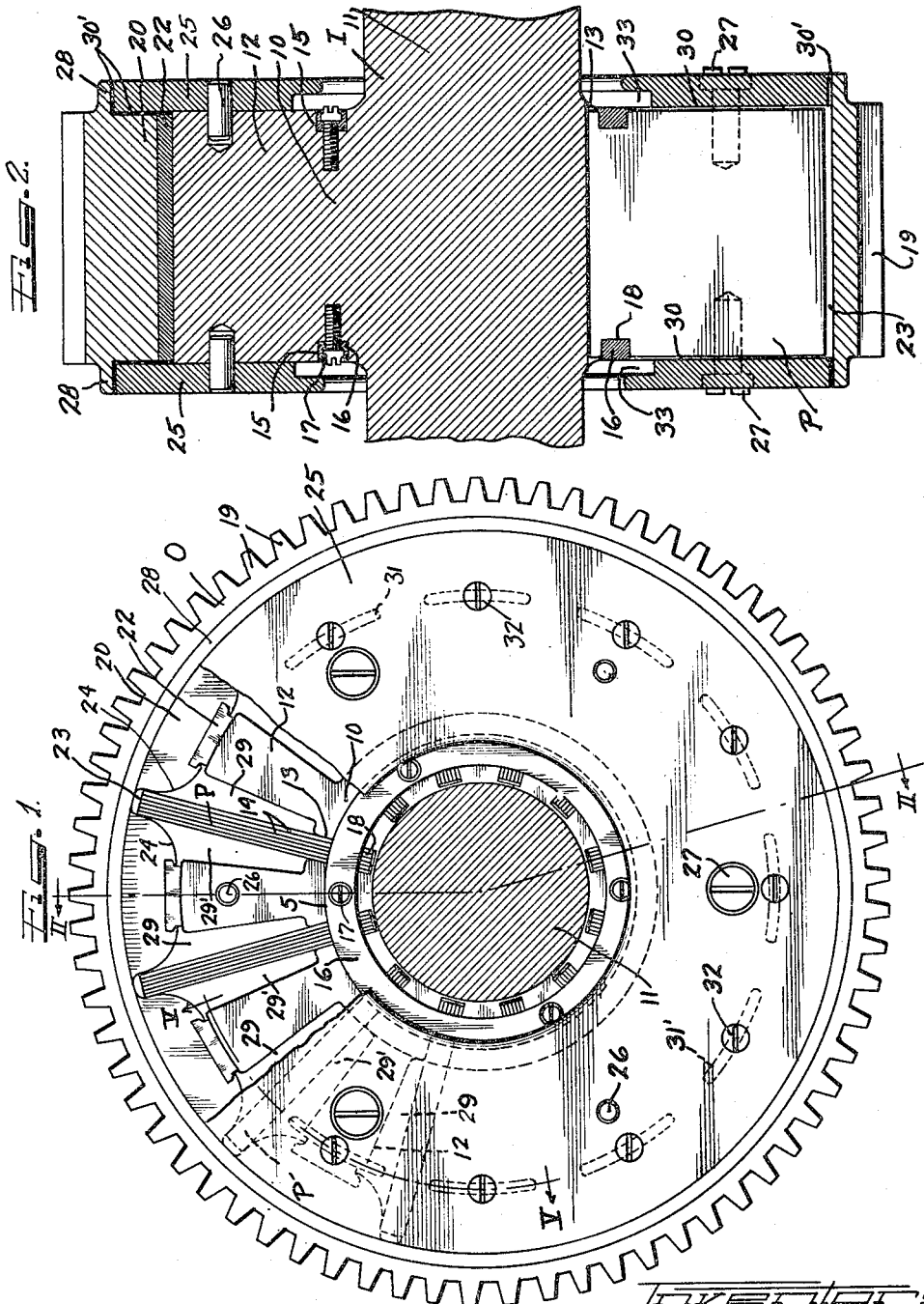

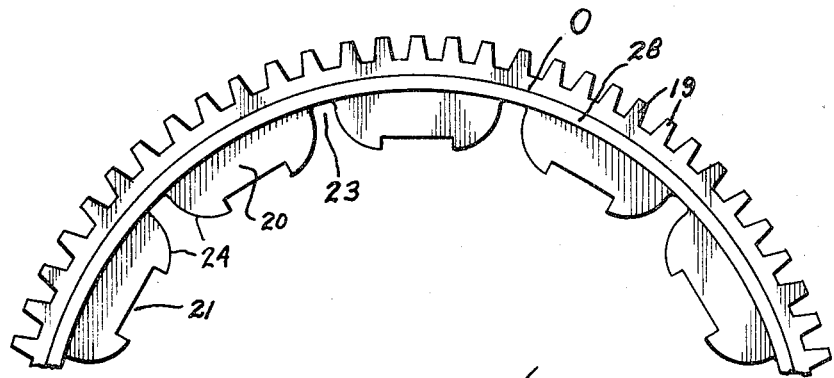
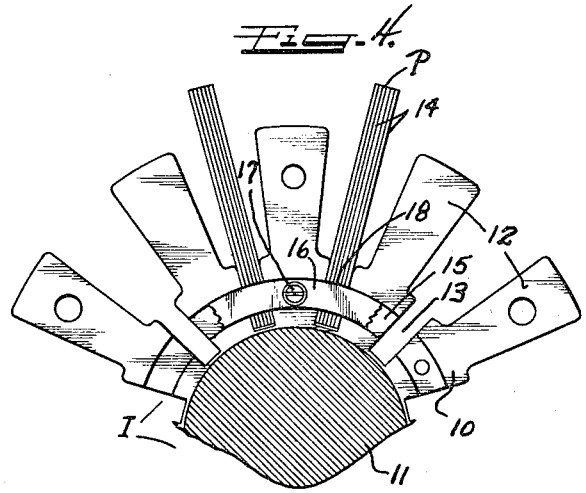
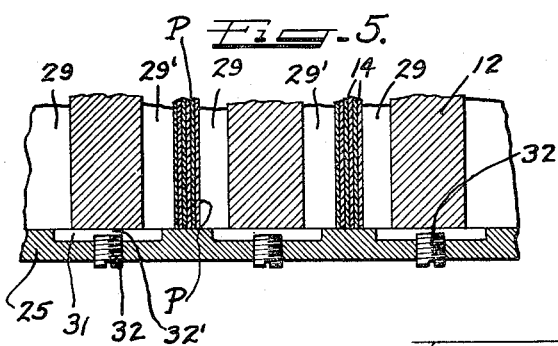

2,266,872

UNITED STATES PATENT OFFICE 2,266,872

RESILIENT DAMPING COUPLING

Austin Kuhns and Emil R. Gasser, Buffalo, N. Y., assignors to Farrel-Birmingham Company, Incorporated, Buffalo, N. Y., a corporation of Connecticut Application January 18, 1941, Serial No. 375,028

6 Claims. (Cl. 64—27)

Our invention relates to resilient damping couplings adapted for general use but which are particularly efficient for connecting devices such as compressors or pumps to a driving source such as an electric motor or Diesel or other hydrocarbon engines. Driving sources of this type are subject to torque fluctuation and sometimes are required to operate in the vicinity of critical speeds where these fundamental torque variations are amplified many times. For these conditions it becomes necessary to have a resilient coupling which is capable of damping and adsorbing energy when in vibration. It is therefore the important object of this invention to produce a simple, compact, economically manufactured, and efficient coupling structure for such conditions of operation.

More in detail the object of the invention is to produce a coupling comprising concentric driving and driven members with packs of leaf springs anchored at one end to one of the members and in driving connection at their other ends with the other member so as to flex during relative movement of the members.

A further important object is to control and dampen the flexure or driving distortion of the spring packs hydraulically, with the hydraulic means adjustable for the desired damping operation.

The various features of our invention are incorporated in the structure shown on the drawings, on which drawings:

Figure 1 is an elevation of the two coupling members with one of the members partially broken away;

Figure 2 is a section on plane II—II of Figure 1;

Figure 3 is a side view of a portion of the outer coupling member;

Figure 4 is a side elevation of a portion of the inner coupling member; and

Figure 5 is a section on plane V—V of Figure 1.

On the coupling shown the inner member I comprises a hub 10 on a shaft 11, this hub having the arms or walls 12 extending radially and equally spaced apart circumferentially. Between these arms the hub has the radial slots 13 in which the inner ends of packs P of leaf springs 14 are securely set and anchored, these spring packs extending radially beyond the ends of the arms 12. In the opposite sides of the hub are annular recesses 15 for receiving retainer rings 16 held in place by screws 17, the spring packs having the side slots 18 for receiving the rings, the spring packs being thus secured and retained in the slots 13 in the hub 10.

The outer member O of the coupling is in the form of a ring surrounding the inner coupling member I and having the gear teeth 19. This gear ring has inwardly extending poles or abutments 20 equal in number to the arms 12 and each abutment having a channel 21 for seating a bearing shoe 22 for engagement by the outer ends of the arms 12. These shoes may be held in the channels by peening the outer corners of the channels against the bases of the shoes, as clearly indicated on Figure 1.

The extensions or abutments 20 are spaced apart to leave bearing channels 23 of sufficient width to receive the outer ends of the spring packs P, the corners of the abutments being rounded as indicated at 24 for coupling engagement of the ends of the spring packs with the abutments as the spring packs flex upon relative rotational displacement of the coupling members during service of the coupling.

The coupling members I and O are held in axial alignment by annular side plates 25 which are held radially aligned by dowel pins 26 and which are rigidly secured against the sides of the hub and the arms 12 by screws 27. The side plates are overlapped circumferentially by the side flanges 28 on the outer coupling member O as clearly shown on Figure 2.

When the coupling is at rest, the spring packs P extend in radial planes midway between adjacent arms 12 and with their ends engaging in the corresponding channels 23 to abut the adjacent sides of the abutment extensions 20. Either the inner or the outer member may be the driving member from which the driving movement will be transmitted to the other member by way of the spring packs.

The transmission from one coupling member to the other is thus resilient. The reason for employing packs of spring leaves or laminations is to utilize the friction between adjacent leaves of the packs and the resulting damping effect which dampens the spring action of the packs.

In order to further dampen and control the transmission spring packs, the spaces between the arms 12 and the abutments 20 are utilized as hydraulic chambers through which the packs extend, the side plates 25 forming end closures for these chambers which are kept filled with hydraulic working fluid of suitable viscosity. When the clutch is at rest, the ends of the arms 12 will be disposed centrally of the bearing shoes 22 and the working chamber spaces 29 and 29' at opposite sides of the spring packs will be of equal capacity. Upon relative rotational displacement of the coupling members the capacity of the chambers at one side of the spring packs will decrease, with a corresponding increase in capacity of the chambers at the other sides of the packs. The width of the spring packs P is slightly less than the width of the arms 12 so as to leave a slight clearance space 30 between the edges of the spring packs and the side plates 25, this clearance being a matter of a few thousandths of an inch. There is also a very slight clearance space 30' between the side plates 25 and the outer coupling member O so that this coupling member may move freely rotatably relative to the coupling member I. When the coupling members become relatively rotationally displaced during service of the coupling and the spring packs flex to decrease the capacity in the hydraulic working spaces at one side of the packs, the displaced fluid will flow through the clearance spaces 30 between the packs and the side plates 25 into the hydraulic working spaces whose volume is being correspondingly increased. The clearance space being comparatively small, resistance will be offered to the flow of the displaced fluid and this will serve to dampen the spring packs operation.

Additional means may be provided for permitting adjustable increased flow of the displaced hydraulic fluid. As best shown on Figure 5, one of the side plates 25 has a circular row of channels 31 cut in its inner side for spanning the arms 12, and each channel connecting the working chamber 29 at one side of the corresponding arm 12 with the working chamber 29' at the opposite side of the arm. Thus as the spring packs are flexed upon relative rotational displacement of the coupling members, the fluid displaced out of the chambers at one side of the spring packs, will flow through the channels 31 into the chambers at the opposite sides of the spring packs. The resistance to flow through the channels 31 may be adjusted as by means of screw plugs 32 threading in the side plates to project across the channels to establish restricted passages 32' depending upon the damping resistance desired. If the inner coupling member I is considered as being the driving member, and the outer member O connected with a load to be driven, then when the member I is started, the spring packs P will be flexed and will resiliently start the driven member O and the load connected therewith, and after the starting resistance of the load has been overcome the spring packs will return to be closer to their normal position. The driven device is thus gradually started and if there are any torque fluctuations or the load increases, this will be resiliently overcome by the spring coupling packs. Any sudden relative rotational displacement of the coupling members will be dampened by the frictional resistance between the individual leaves of the spring packs and by the controlled and metered flow of hydraulic fluid displaced by the packs as they are flexed during operation of the coupling.

For proper hydraulic control, the hydraulic working chambers must be kept filled with hydraulic fluid of proper viscosity. As shown on Figure 2, the side plates 25 are shaped at their inner peripheries to provide annular wells 33 into which oil may be fed. The fluid will flow from these wells into the working chambers and keep them sufficiently filled for operation of the hydraulic damping means during running of the clutch. Under centrifugal force, oil may leak out of the clutch through the clearance spaces between the clutch members but this leakage oil may be caught in any suitable manner and returned to the coupling.

We have thus produced a simple resilient coupling which is efficiently capable of absorbing energy when in vibration and which will dampen torque fluctuations so that smooth transmission is assured.

We have shown practical and efficient embodiment of the features of our invention but we do not desire to be limited to the exact structure, arrangement and operation shown and described as changes and modifications may be made without departing from the scope of the invention.

We claim as our invention:

1. A coupling of the class described comprising concentric inner and outer members, packs of spring leaves secured to one of said members and having abutting engagement with the other member for transmitting rotational movement of one member to the other member, means forming hydraulic working chambers through which said packs extend and in which hydraulic fluid is displaced from one side of the spring packs to the other side thereof during relative rotational displacement of said members, and means for controlling the flow of the displaced hydraulic fluid for dampening the relative movement of said members.

2. A coupling of the class described comprising inner and outer concentric members, spaced apart arms extending radially from said inner member, spaced apart abutments extending inwardly from said outer member for bearing engagement with the ends of said arms, leaf springs anchored at their inner ends to said inner member and extending outwardly between said arms for abutting engagement at their outer ends between the abutments on said outer member whereby rotation of one of said members will be resiliently transmitted to the other member, side plates secured to one of said members and overlapping the other member and defining with said members hydraulic working spaces between said springs and said arms for displacement of hydraulic fluid from the spaces at one side of said springs to the spaces at the opposite side thereof during relative rotational movement of said members, and means defining adjustable resistance paths for the displacement of fluid whereby the relative movement of said members is hydraulically dampened.

3. A rotary coupling of the class described comprising an inner member and a concentric surrounding outer member, circumferentially spaced apart arms extending outwardly from said inner member, abutments extending inwardly from said outer member with which said arms at their outer ends have bearing engagement, packs of spring leaves anchored at their inner ends to said inner member between said arms and having abutting engagement at their outer ends between said abutments whereby rotational movement of one of said members will be resiliently transmitted to the other member, side plates secured to said inner member and overlapping said outer member and with said arms and abutments defining hydraulic working spaces between said spring packs and said arms for the displacement of hydraulic fluid from the spaces at one side of said spring packs to the other side thereof during relative rotational displacement of said members, and means defining restricted paths for the flow of the displacement fluid whereby relative movement of said members is hydraulically resisted and dampened.

4. A rotary coupling comprising an inner member having a supporting shaft for a hub thereon, circumferentially spaced apart arms on said hub extending radially therefrom, an outer member concentric with said inner member and having circumferentially spaced apart abutments thereon in alignment with said arms, annular side plates secured to said inner member and overlapping said outer member to hold said members in axial alignment, packs of spring leaves anchored at their inner ends to said hub and extending outwardly between said arms into the spaces between said abutments whereby rotational movement of the inner member will be resiliently transmitted to the outer member, said side plates with said arms and abutments defining hydraulic working spaces at opposite sides of said spring packs and arms in which fluid is displaced under pressure during relative rotational displacement of said members, means defining restricted paths for the flow of the displaced fluid whereby relative rotational displacement of the members will be hydraulically resisted and dampened, said side plates being formed to provide wells from which hydraulic fluid may flow into said hydraulic working spaces for maintaining the proper quantity of hydraulic fluid in said spaces during operation of the coupling.

5. A rotary coupling comprising an inner member having a supporting shaft for a hub thereon, circumferentially spaced apart arms on said hub extending radially therefrom, an outer member concentric with said inner member and having circumferentially spaced apart abutments thereon in alignment with said arms, annular side plates secured to said inner member and overlapping said outer member to hold said members in axial alignment, packs of spring leaves anchored at their inner ends to said hub and extending outwardly between said arms into the spaces between said abutments whereby rotational movement of the inner member will be resiliently transmitted to the outer member, said side plates with said arms and abutments defining hydraulic working spaces at opposite sides of said spring packs and arms in which fluid is displaced under pressure during relative rotational displacement of said members, there being restricted clearance between the side edges of said spring packs and said side plates for the restricted flow of displaced fluid from the hydraulic spaces at one side of said spring packs to the other side thereof, means in one of said side plates defining fluid flow channels between the hydraulic spaces at opposite sides of said arms, and means for adjusting said flow channels.

6. A coupling of the class described comprising concentric inner and outer relatively rotatable members having walls enclosing an annular space, arms extending from one of said members for bearing engagement with the other member and subdividing said annular space into fluid working chambers, packs of spring leaves extending through said chambers to form partitions therein, said spring packs being secured to one of said members and having abutting engagement with the other member whereby upon rotation of one of said members said spring packs will flex for resiliently transmitting such rotational movement to the other member and whereby the flexure of said spring packs will displace the working fluid in said chambers, and means for controlling the flow of the displaced fluid for dampening the relative movement of said members.

AUSTIN KUHNS.
EMIL R. GASSER.